United States Patent
Ohnuma (10) Patent No.: US 8,645,624 B2
(45) Date of Patent: Feb. 4, 2014

(54) PORTABLE ELECTRONIC DEVICE, SMARTCARD AND CONTROL METHOD FOR PORTABLE ELECTRONIC DEVICE

(75) Inventor: Tomomi Ohnuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 526 days.

(21) Appl. No.: 12/712,512

(22) Filed: Feb. 25, 2010

(65) Prior Publication Data

US 2011/0016274 A1 Jan. 20, 2011

(30) Foreign Application Priority Data

Jul. 15, 2009 (JP) ................................. 2009-166851

(51) Int. Cl.
*G06F 12/00* (2006.01)

(52) U.S. Cl.
USPC .......................................... 711/115; 235/492

(58) Field of Classification Search
None
See application file for complete search history.

(56) References Cited

U.S. PATENT DOCUMENTS

| | | | |
|---|---|---|---|
| 2001/0042059 A1* | 11/2001 | Uehara et al. ..................... | 707/1 |
| 2010/0012723 A1* | 1/2010 | Tuda ............................. | 235/439 |

FOREIGN PATENT DOCUMENTS

| | | |
|---|---|---|
| EP | 1 006 478 | 6/2000 |
| EP | 1 770 659 | 4/2007 |
| JP | 63-233490 | 9/1988 |
| JP | 2007-102312 | 4/2007 |
| JP | 2007-114961 | 5/2007 |
| JP | 2007-193745 | 8/2007 |
| JP | 2007-323273 | 12/2007 |
| JP | 2008-047042 | 2/2008 |
| WO | WO 2008/096759 | 8/2008 |

OTHER PUBLICATIONS

Singapore Search Report and Written Opinion dated Dec. 20, 2010.
European Search Report dated Feb. 7, 2011.

* cited by examiner

*Primary Examiner* — Alford W. Kindred
*Assistant Examiner* — Daniel Tsui
(74) *Attorney, Agent, or Firm* — Pillsbury Winthrop Shaw Pittman, LLP (57) ABSTRACT

A smartcard includes a write unit that writes data to be written to a data memory according to a write command supplied from an external device, a determining unit that determines whether important data is contained in the data to be written specified by the write command supplied from the external device, a calculating unit that calculates a head address of the important data in the data memory based on data length from a head of the data to be written to a head of the important data and an address on the data memory at which a process of writing the data to be written is started when the determining unit determines that important data is contained in the data to be written, and a position table that stores information indicating a head address of the important data in correspondence to information indicating the important data.

10 Claims, 6 Drawing Sheets

PORTABLE ELECTRONIC DEVICE, SMARTCARD AND CONTROL METHOD FOR PORTABLE ELECTRONIC DEVICE

CROSS-REFERENCE TO RELATED APPLICATIONS

This application is based upon and claims the benefit of priority from prior Japanese Patent Application No. 2009-166851, filed Jul. 15, 2009, the entire contents of which are incorporated herein by reference.

BACKGROUND OF THE INVENTION

1. Field of the Invention

This invention relates to a portable electronic device such as a smartcard that comprises a writable or rewritable nonvolatile memory and a control device such as a CPU and performs a process according to a command from the exterior, a smartcard and a control method for the portable electronic device.

2. Description of the Related Art

Conventionally, a smartcard used as a portable electronic device comprises a data memory as a nonvolatile memory, a working memory as a volatile memory, a CPU used as a control device that accesses (data reading and/or writing) the above memories, and a program memory that stores programs or the like used for the operation of the CPU. In the above smartcard, a process of inputting or outputting data is performed based on command data supplied from an external device. Recently, the smartcards described above are used in various industrial fields.

Further, some of data items stored in the data memory of the smartcard may contain data with a TLV structure configured by an identifier that indicates a type of the data, length information indicating the length of the data and a data portion indicating the data itself. In order to access the data with the TLV structure, access can be made by using a command that specifies the identifier. For example, the smartcard retrieves data to be read by using the identifier in response to a read command received from an external device. If it is detected by the retrieval that data to be read is present, the smartcard reads data of data length indicated by length information that follows the identifier of the data to be read.

Among the data items with the TLV structure, data with a nested structure in which a plurality of child data items are stored in a data portion of parent data is provided. In the data with the nested structure, for example, a tag field or the like structured by ISO/IEC7816-4 Annex. D is defined. When access is made to data that is a part of the data with the nested structure, data to be accessed is retrieved by sequentially analyzing the data with the nested structure from the head by means of the conventional smartcard. In the above access control operation, when the size of the data with the nested structure is large or when access is frequently made to data that is a part of the data with the nested structure, it takes an excessively long time to perform the process. Particularly, recently, an application form in which massive data such as a digital signature or a public-key certificate such as e-Passport, for example, is stored in a smartcard is used in many cases. In the above application form, it is required to enhance the speed of the operation for controlling access to data that is a part of massive data.

BRIEF SUMMARY OF THE INVENTION

An embodiment of the present invention is intended to provide a portable electronic device, a smartcard and a control method for the portable electronic device, which enable efficient access to data.

A portable electronic device according to an aspect of the present invention, comprising a data memory that stores data, a write unit that writes data to be written to the data memory according to a write command supplied from an external device, a determining unit that determines whether important data is contained in the data to be written specified by the write command supplied from the external device, a calculating unit that calculates a head address of the important data in the data memory based on data length from a head of the data to be written to a head of the important data and an address on the data memory at which a process of writing the data to be written is started when the determining unit determines that important data is contained in the data to be written, and a position table that stores information indicating a head address of the important data calculated by the calculating unit in correspondence to information indicating the important data.

A portable electronic device according to an aspect of the present invention, comprising a data memory that stores data, a position table that stores information indicating a position in which important data is stored in the data memory in correspondence to information indicating the important data, a determining unit that determines whether data to be read specified by a command that is supplied from an external device and requires data reading in a course of a process is important data, and a reading unit that reads the important data according to a position in the data memory in which the important data stored in the position table is provided when the determining unit determines that the data to be read is important data.

A portable electronic device according to an aspect of the present invention, comprising a data memory that stores data, a position table that stores address information indicating a position in which important data is stored in the data memory in correspondence to information indicating the important data, a rewrite unit that rewrites data to be rewritten according to a rewrite command supplied from an external device, a determining unit that determines whether the data to be rewritten specified by the rewrite command supplied from the external device is data in data containing important data, a calculating unit that calculates a head address of the important data in the data memory after a data rewrite process corresponding to the rewrite command when the determining unit determines that the data to be rewritten is data in the data containing the important data, and an updating unit that updates information indicating a head address of the important data stored in the position table in correspondence to information indicating the important data based on a head address of the important data calculated by the calculating unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of this invention will be explained with reference to the accompanying drawings.

Figure 1:
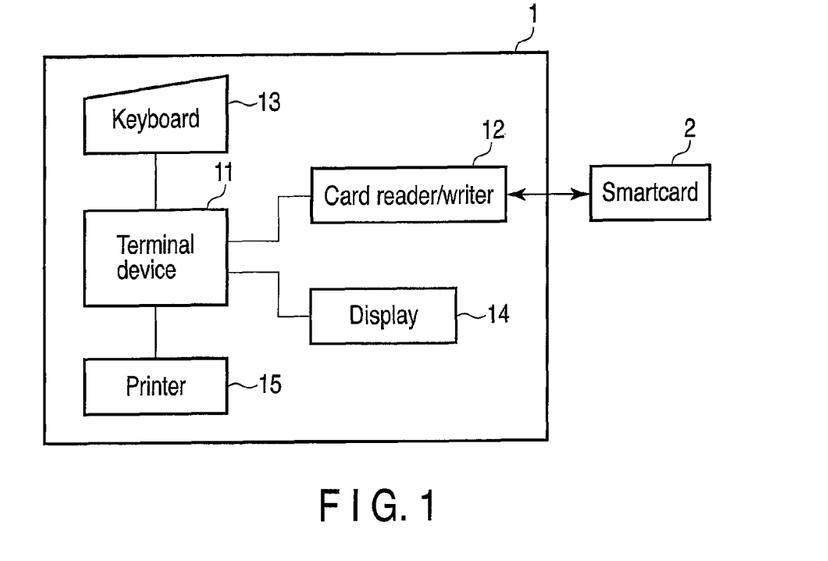
FIG. 1 is a block diagram schematically showing an example of the configuration of a smartcard (portable electronic device) and smartcard processing apparatus according to an embodiment of this invention.

FIG. 1 is a block diagram schematically showing an example of the configuration of a smartcard (portable electronic device) 2 according to an embodiment of this invention and a smartcard processing apparatus 1 used as an external device that has a function of communicating with the smartcard 2.

First, the configuration of the smartcard processing apparatus 1 is explained.

As shown in FIG. 1, the smartcard processing apparatus 1 comprises a terminal device 11, card reader/writer 12, keyboard 13, display 14, printer 15 and the like.

The terminal device 11 controls the operation of the whole portion of the smartcard processing apparatus 1. The terminal device 11 comprises a CPU, various memories, various interfaces and the like. For example, the terminal device 11 is configured by a personal computer (PC).

The terminal device 11 has a function of transmitting a command to the smartcard 2 by means of the card reader/writer 12, a function of performing various processes based on data received from the smartcard 2 and the like. For example, the terminal device 11 controls a process of writing data to the nonvolatile memory in the smartcard 2 by transmitting a data write command to the smartcard 2 via the card reader/writer 12. Further, the terminal device 11 controls a process of reading data from the smartcard 2 by transmitting a read command to the smartcard 2.

The card reader/writer 12 is an interface device that communicates with the smartcard 2. The card reader/writer 12 is configured by an interface corresponding to a communication system of the smartcard 2. For example, if the smartcard 2 is a contact smartcard, the card reader/writer 12 comprises a contact portion that makes physical and electrical contact with the contact portion of the smartcard 2. Further, if the smartcard 2 is a contactless smartcard, the card reader/writer 12 comprises an antenna and communication control portion to wirelessly communicate with the smartcard 2. In the card reader/writer 12, the operations of power supply, clock supply, reset control, data reception/transmission and the like with respect to the smartcard 2 are performed. By utilizing the above functions, the card reader/writer 12 activates (starts) the smartcard 2, transmits various commands and receives a response with respect to the transmitted command based on the control operation by the terminal device 11.

The keyboard 13 functions as an operating portion operated by an operator of the smartcard processing apparatus 1 and various operation instructions, data and the like are input by the operator. The display 14 is a display device that displays various information items under the control of the terminal device 11. The printer 15 prints and outputs various data items such as the processing result.

Figure 2:
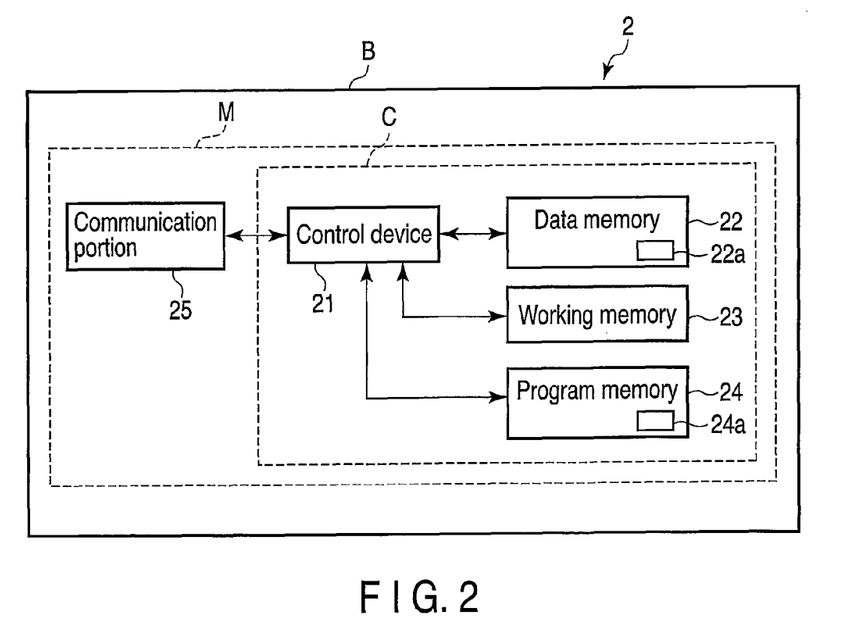
FIG. 2 is a block diagram schematically showing an example of the hardware configuration of the smartcard.

Next, an example of the hardware configuration of the smartcard 2 is explained.

When receiving power supply from, for example, a host device of the smartcard processing apparatus 1, the smartcard 2 is activated (set into an operable state). For example, if the smartcard 2 is connected to the smartcard processing apparatus 1 in a contact communication system, that is, if the smartcard 2 is configured by a contact smartcard, the smartcard 2 receives operation power supply and clock supply from the smartcard processing apparatus 1 via a contact portion used as a communication interface and is activated.

Further, if the smartcard 2 is connected to the smartcard processing apparatus 1 in a contactless communication system, that is, if the smartcard 2 is configured by a contactless smartcard, the smartcard 2 receives radio waves from the smartcard processing apparatus 1 via an antenna and modulation/demodulation circuit used as a communication interface. Then, the smartcard generates operation power supply and operation clock from a power source portion (not shown) based on the radio waves and is activated.

FIG. 2 is a block diagram schematically showing an example of the hardware configuration of the smartcard 2 according to this embodiment.

The smartcard 2 contains a module M in a casing that configures a main body B. The module M is integrally formed with one smartchip or a plurality of smartchips connected to an external interface (communication interface) for communication and buried in the main body B of the smartcard 2. Further, as shown in FIG. 2, the module M of the smartcard 2 comprises a control device 21, data memory 22, working memory 23, program memory 24, communication portion 25 and the like.

The control device 21 controls the whole portion of the smartcard 2. The control device 21 is operated based on a control program and control data stored in the program memory 24 or data memory 22 to realize various functions. For example, the control device 21 performs the basic operation control operation of the smartcard 2 by executing the program of an operating system. Further, the control device 21 performs various operation control operations corresponding to an operation configuration of the smartcard 2 by executing an application program corresponding to a utilization purpose of the smartcard 2.

The data memory 22 is configured by a data writable and rewritable nonvolatile memory such as an electrically erasable programmable read-only memory (EEPROM) or flash ROM, for example. In the data memory 22, various data items or a control program corresponding to a utilization application of the smartcard 2 is written. In the data memory 22, various files corresponding to the standard of the smartcard 2 are defined and various data items are written in the files. An example of the file stored in the data memory 22 will be explained later. Further, a pointer table used for various control operations is provided in the data memory 22. For example, an important data pointer table (position table) 22a that indicates the position (address) of important data such as data that is frequently used or data with high importance is provided in the data memory 22.

The working memory 23 is a nonvolatile memory such as a RAM. The working memory 23 functions as a buffer that temporarily holds data that is now processed by the control device 21.

The program memory 24 is a nonvolatile memory such as a mask ROM in which a control program and control data are previously stored. The program memory 24 is incorporated in the smartcard 2 while the control program or control data is stored therein at the manufacturing stage of the smartcard. That is, the control program or control data stored in the program memory 24 is used to control the basic operation of the smartcard and is incorporated according to the specification of the smartcard 2. Further, an important data setting table 24a that indicates important data such as data that is frequently used or data with high importance among data items stored in the data memory 22 is provided in the program memory 24.

The communication portion 25 is an interface to communicate with the card reader/writer 12 of the smartcard processing apparatus 1. When the smartcard 2 is realized as a contact smartcard, the communication portion 25 comprises a communication control portion and contact portion that make physical and electrical contact with the card reader/writer 12 of the smartcard processing apparatus 1 to transmit and receive signals. Further, when the smartcard 2 is realized as a contactless smartcard, the communication portion 25 comprises a communication control portion such as a modulation/demodulation circuit that wirelessly communicates with the card reader/writer 12 of the smartcard processing apparatus 1 and an antenna that transmits and receives radio waves.

Figure 3:
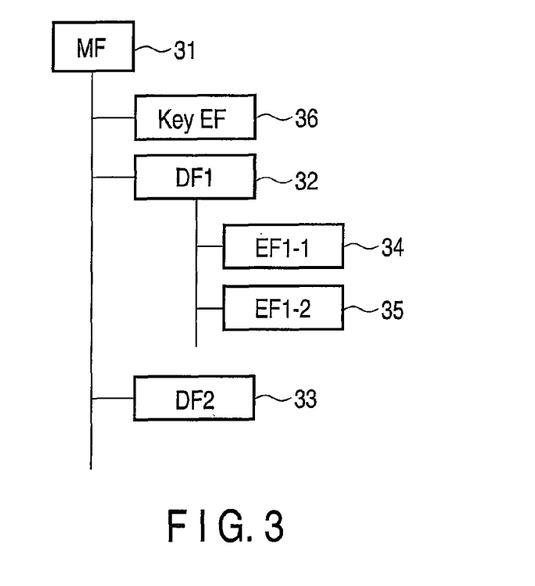
FIG. 3 is a diagram showing an example of the structure of files stored in a data memory.

Next, files stored in the data memory 22 are explained.

FIG. 3 is a diagram showing an example of the structure of files stored in the data memory 22.

As shown in FIG. 3, in the data memory 22, a plurality of file groups having a hierarchical structure that comprises a master File (MF), dedicated file (DF) and elementary file (EF) are defined. In the example shown in FIG. 3, a key EF 36, first DF (DF1) 32 and second DF (DF2) 33 are provided in the next-stage hierarchy of the master file (MF) 31 of the uppermost hierarchy. For example, in the key EF 36, key data functioning as a key for establishing the access right with respect to the smartcard 2 or a key for authentication thereof is stored.

Further, in each DF, data that realizes applications of the smartcard 2 is stored. For example, DF1 and DF2 store data items that realize an application functioning as a credit card or an application functioning as a point card.

In the example shown in FIG. 3, a first EF (EF1-1) 34 and second EF (EF1-2) 35 are provided as subordinates of the first DF (DF1) 32 in the next-stage hierarchy of DF1. Each EF 34, 35 is a data file to store various data items. In each EF, data items with plural types of data structures are stored. For example, as the data structures stored in each EF, a transparent structure and record structure are provided. An EF with a transparent structure (transparent-structure EF) is a file to store a series of non-structured data items. Data stored in the transparent-structure EF is dealt with by offset specification in a command or the like. On the other hand, an EF with a record structure (record-structure EF) is a file to store a plurality of data items (records) structured in a preset form. In the record-structure EF, a record to be accessed is specified in a command or the like.

Figure 4:
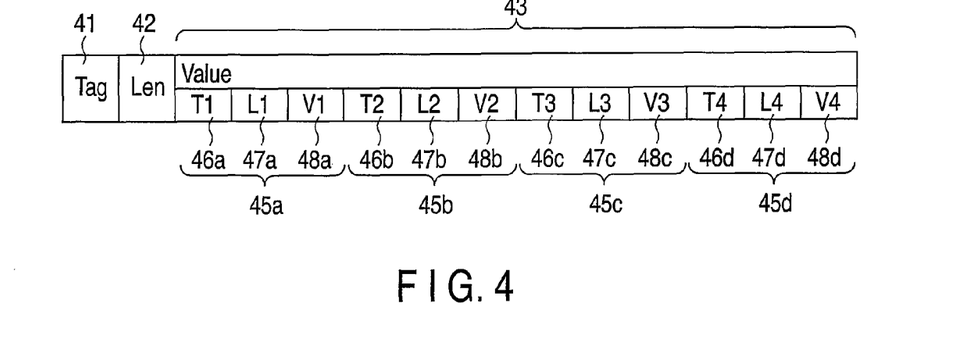
FIG. 4 is a diagram showing an example of the data configuration of a record-structure EF.

Next, the configuration of the record-structure EF is explained.

FIG. 4 is a diagram showing an example of the data configuration in the record-structure EF.

An EF shown in FIG. 4 is one example of the record-structure EF. The EF shown in FIG. 4 is a file in which data with the TLV structure having an identifier (Tag) 41, length information (Length) 42 and data portion (Value) 43 sequentially connected in this order is stored. The EF shown in FIG. 4 is identified by means of the identifier 41 and the data potion 43 is defined by the length information 42 following the identifier 41. Further, in the EF shown in FIG. 4, a plurality of data items (child data items) with the TLV structure are stored in the data portion 43 of the EF. In other words, If data comprising the identifier 41, length information 42 and data portion 43 is set as parent data, data shown in FIG. 4 is data with a nested structure in which a plurality of child data items are stored in the parent data. In the following explanation, in the parent data as the whole EF comprising data with the nested structure, the identifier 41 is referred to as a parent identifier, the length information 42 is referred to as parent length information and the data portion 43 is referred to as a parent data portion.

A plurality of child data items stored in the parent data portion 43 also have the TLV structure. That is, each child data 45(45a, 45b, 45c, 45d) in the parent data portion 43 has a structure in which an identifier 46 (46a, 46b, 46c, 46d), length 47 (47a, 47b, 47c, 47d) and data portion 48 (48a, 48b, 48c, 48d) are sequentially connected. In the following explanation, in each child data, the identifier 46 (46a, 46b, 46c, 46d) is referred to as a child identifier, the length information 47 (47a, 47b, 47c, 47d) is referred to as child length information and the data portion 48 (48a, 48b, 48c, 48d) is referred to as a child data portion.

Further, in the following explanation, it is supposed that the identifier 41 of the parent data, the length information 42 of the parent data, the identifier 46 of the child data and the length information 47 of the child data are each expressed by one byte.

Next, the operation of controlling access to the above file in the smartcard 2 is explained.

The smartcard 2 performs an access control operation with respect to the above file in response to a command supplied from the external device (smartcard processing apparatus) 1. For example, the smartcard 2 performs an access (read, write, update, erase and the like) operation for a file specified by a command from the external device 1 or data in the file.

For example, in the record-structure EF as shown in FIG. 4, access to data can be made by using a record-series command such as a READ RECORD command, WRITE RECORD command, UPDATE RECORD command, APPEND RECORD command or the like. Even in the case of the record EF, access may be made by using a binary-series command such as a READ BINARY command, WRITE BINARY command or the like by making access with the record EF artificially used as the transparent-structure EF.

The above command is configured in a preset format. For example, in a command supplied to the smartcard 2, information indicating the type of the command and file to be accessed or data is stored in a preset format. For example, in each command, parent data to be accessed (that is, EF) can be specified by means of a parent identifier and child data to be accessed can be specified by means of a child identifier.

Figure 5:
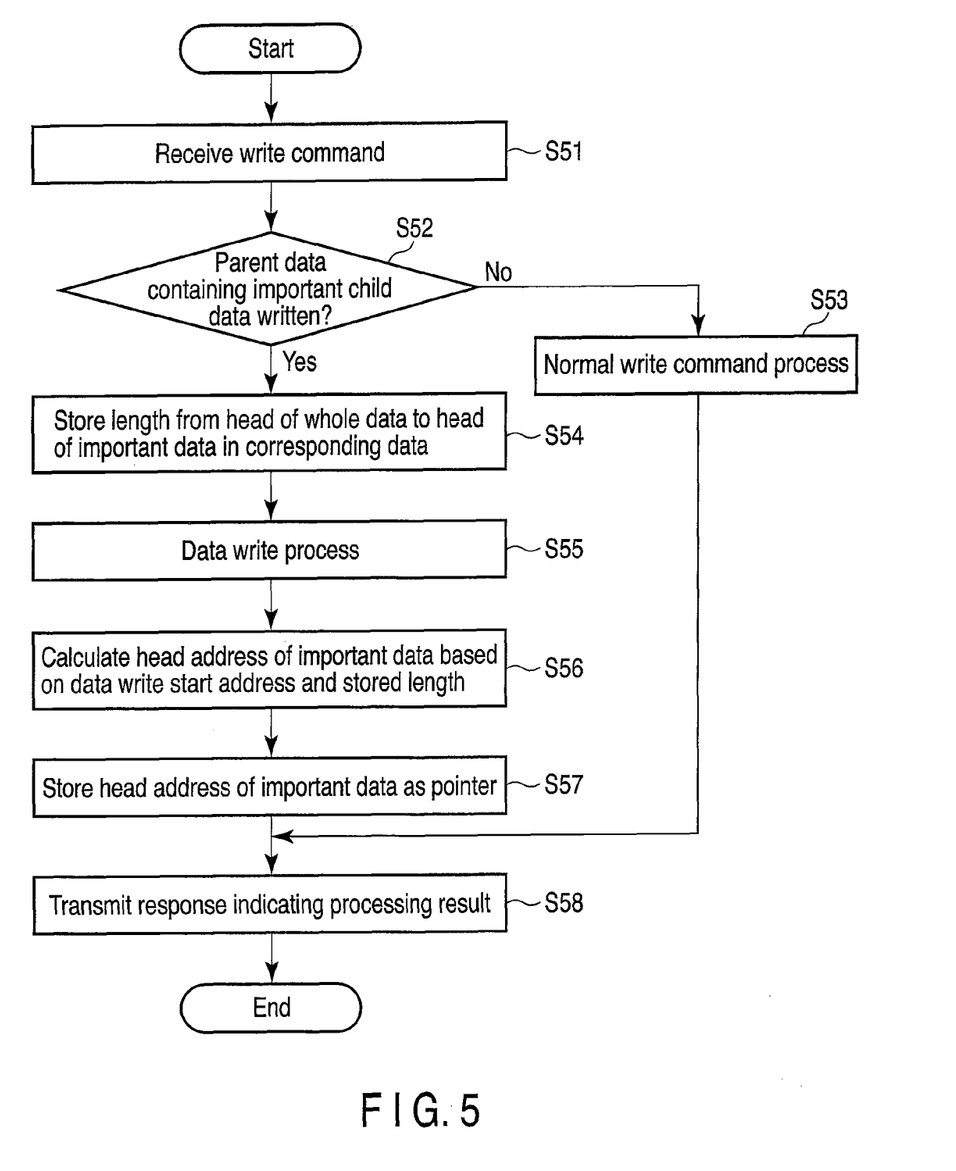
FIG. 5 is a flowchart for illustrating a flow of a process for a write command in the smartcard.

Next, a process for a write command that requests data writing in the smartcard 2 is explained.

FIG. 5 is a flowchart for illustrating a flow of a process for a write command (for example, a WRITE RECORD command) in the smartcard 2. In this example, as the process for coping with the write command, a write process for data with a nested structure as shown in FIG. 4 is supposed. Further, it is supposed that child data with high importance or with high frequency of use (in the following explanation, such child data is referred to as important data) as preset child data may be contained in the nested-structure data (EF) used as parent data to be written in some cases.

It is now assumed that the card reader/writer 12 of the smartcard processing apparatus 1 as the external device supplies a write command that request data writing to the smartcard 2. Then, the smartcard 2 supplies data as the write command received via the communication portion 25 to the control device (CPU) 21. After this, the control device 21 recognizes that the command is a write command based on a command code in the data (received command) supplied from the communication portion 25 (step S51).

The command supplied to the smartcard 2 comprises a command code indicating the type of the command, parameter and data portion. The control device 21 of the smartcard 2 analyses the command code of the received command to determine the type of the received command (instruction content). The above process is realized by causing the control device 21 to execute the program stored in the program memory 24. The write command contains a command code indicating a write instruction and data to be written (write data). For example, in a write command that requests writing of data with the nested structure as shown in FIG. 4, write data containing an identifier (parent identifier) of parent data is stored in the data portion.

When receiving the above write command, the control device (CPU) 21 determines whether or not the parent identifier (identifier of a file) of parent data contained in write data specified by the data portion of the command is a parent identifier of parent data (file) containing important data (step S52). Whether or not the parent identifier of the write data is the identifier of the parent data containing the important data is determined based on the important data setting table 24a provided in the program memory 24. The important data setting table 24a stores information indicating parent data (file) containing important data. For example, in the important data setting table 24a, an identifier (parent identifier of parent data) of a file containing important data and a child identifier of important data in the file are stored.

Information stored in the important data setting table 24a is previously set information. This is because information associated with a file (parent data) in which the important data is stored and important data (child data) stored in the file is previously determined for each application in the operation configuration of the smartcard 2. Therefore, the important data setting table 24a that stores information associated with important data is previously provided in the nonvolatile memory. However, it is preferable to provide the important data setting table 24a in a region in which security is attained. In the smartcard 2, it is supposed that the important data setting table 24a is stored in the program memory 24. Further, it is also possible to provide the important data setting table 24a in a storage region of the data memory 22 in which security is attained.

If it is determined in the above determination step that the write data is not parent data (file) containing important data (NO in step S52), the control device 21 performs a normal write command process (step S53).

If it is determined in the above determination step that the write data is parent data (file) containing important data (YES in step S52), the control device 21 stores the length from the head position (position of the parent identifier) of the parent data as the write data to the head position (position of the child identifier) of the child data as the important data in the working memory 23 (step S54).

If length information from the head of the parent data to the head of the important data is stored in the working memory 23, the control device 21 performs a process of writing data in the data memory 22 according to the write command (step S55). At the time of writing data according to the write command, the control device 21 calculates a head address of the important data in the written data (step S56). The head address of the important data is calculated by adding the length from the head of the parent data stored in the working memory 23 to the head of the important data to a write start address of the parent data in the data memory 22.

If the head address of the important data is calculated, the control device 21 stores the thus calculated head address of the important data as a pointer corresponding to the important data in the data memory 22 (step S57). The pointer of the important data is information set for each important data and stored in the pointer table 22a. For example, in the pointer table 22a, an address indicating the head position of the important data is stored as a pointer of each important data in correspondence to the identifier of the important data (child identifier of child data) and the identifier of the file (parent identifier of parent data) containing the important data.

If the above process is completed, the control device 21 transmits response data indicating the processing result of the write command to the smartcard processing apparatus 1 as a transmission source of the write command (step S58).

The process of steps S52 to S57 may be performed by adequately changing the execution order.

As described above, when the smartcard 2 receives a write command from the smartcard processing apparatus 1, the smartcard determines whether or not important data is contained in data to be written specified by the write command based on the important data setting table 24a. Then, if it is determined by the above determination step that the important data is contained in the data to be written, an address of the important data to be written according to the write command in the data memory 22 is calculated and the thus calculated address of the important data is stored in the pointer table 22a.

According to the above write process, information indicating the position of the important data contained in the parent data stored as a file in the data memory 22 can be easily determined by means of the pointer table 22a and, as a result, the smartcard 2 in which access can be made to the important data at high speed and with high efficiency can be provided.

Figure 6:
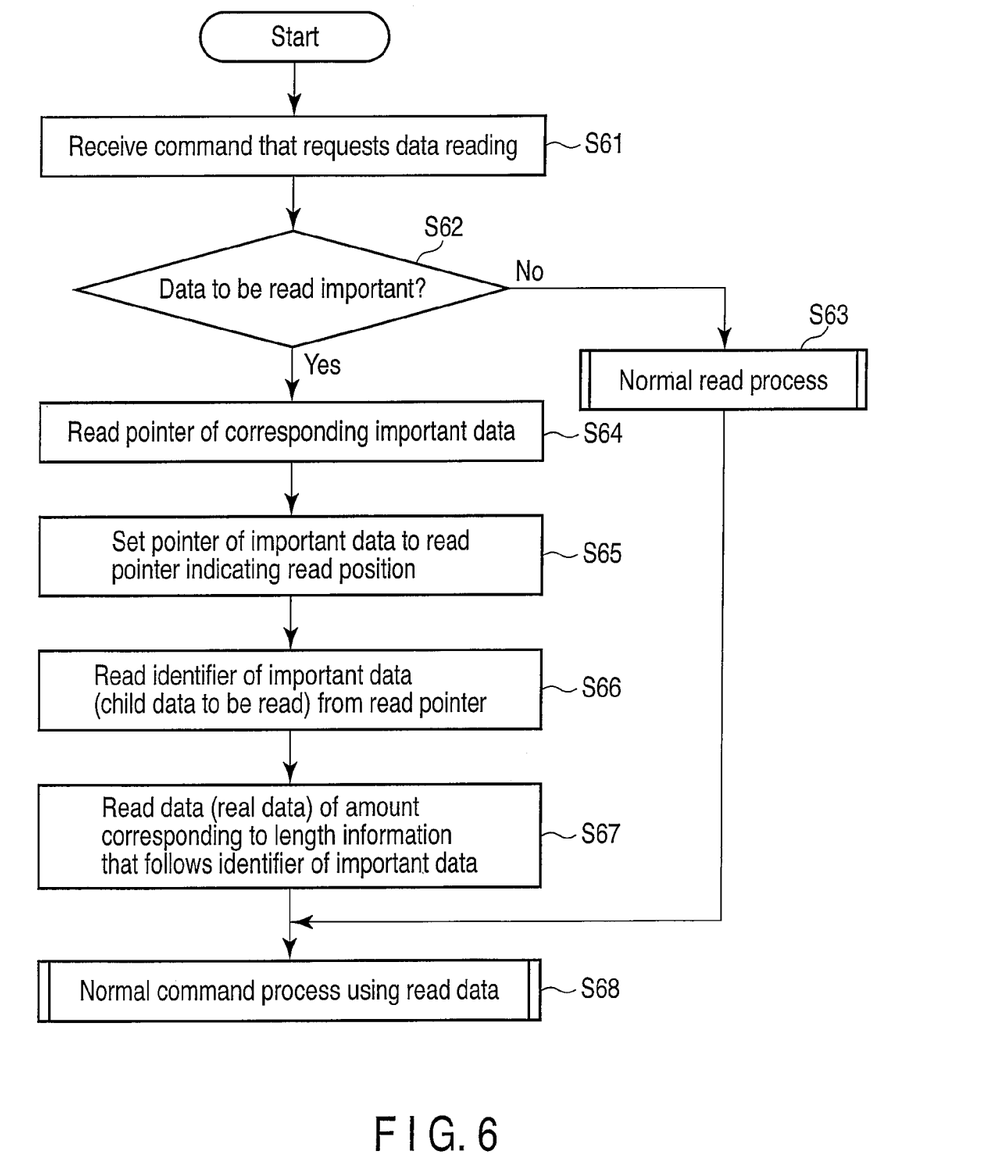
FIG. 6 is a flowchart for illustrating a flow of a process for a command that requires data reading in the course of a data process in the smartcard.

Next, a process for a command that requests data reading in the process in the smartcard 2 is explained.

FIG. 6 is a flowchart for illustrating a flow of a process for an operation processing (for example, data encoding, decoding) command (for example, GENERATE AC command) in the smartcard 2. In this example, as a process for coping with the command, a process for reading data specified by data with the nested structure as shown in FIG. 4 in the course of the process is supposed. Further, it is supposed that important data may be contained as child data in the data with the nested structure (data file) as parent data to be accessed in some cases.

First, it is supposed that the card reader/writer 12 of the smartcard processing apparatus 1 as the external device supplies a command that requests an operation process to the smartcard 2. Then, the smartcard 2 receives data as the command via the communication portion 25 and supplies the same to the control device (CPU) 21. After this, the control device 21 recognizes that the command is a command used to read data in the smartcard and perform a process of operations based on a command code in the data (received command) supplied from the communication portion 25 (step S61).

When receiving the above command, the control device (CPU) 21 determines whether data to be accessed (read) for the process in the command is important data or not (step S62). Whether the data to be read is important data or not is determined according to whether or not the identifier of important data stored in the important data setting table 24a coincides with an identifier to be read specified in the step of processing the command.

If it is determined in the above determination step that the data to be read is not important data (NO in step S62), the control device 21 performs a normal command process (step S63). The normal command process is performed according to a flow of a process shown in FIG. 7. The normal command process is explained later in detail.

If it is determined in the above determination step that the data to be read is important data (YES in step S62), the control device 21 reads a pointer of the important data as an address in which the important data to be read is stored from the pointer table 22a of the data memory 22 (step S64). When reading the pointer of the important data, the control device 21 sets an address as the pointer of the important data in a read pointer indicating a read position (step S65). For example, the pointer is stored in the working memory 23. However, the read pointer may be stored in a rewritable memory and, for example, it may be stored in the data memory 22.

When setting the pointer of the important data in the read pointer, the control device 21 reads an identifier of important data as child data to be read from an address on the data memory 22 indicated by the read pointer (step S66). Further, the control device 21 reads length information that follows the identifier of the important data and reads data of the data portion indicated by the length information (step S67). When the data read operation is completed, the control device 21 receives the read data and performs a normal command process such as an operation process (step S68).

Figure 7:
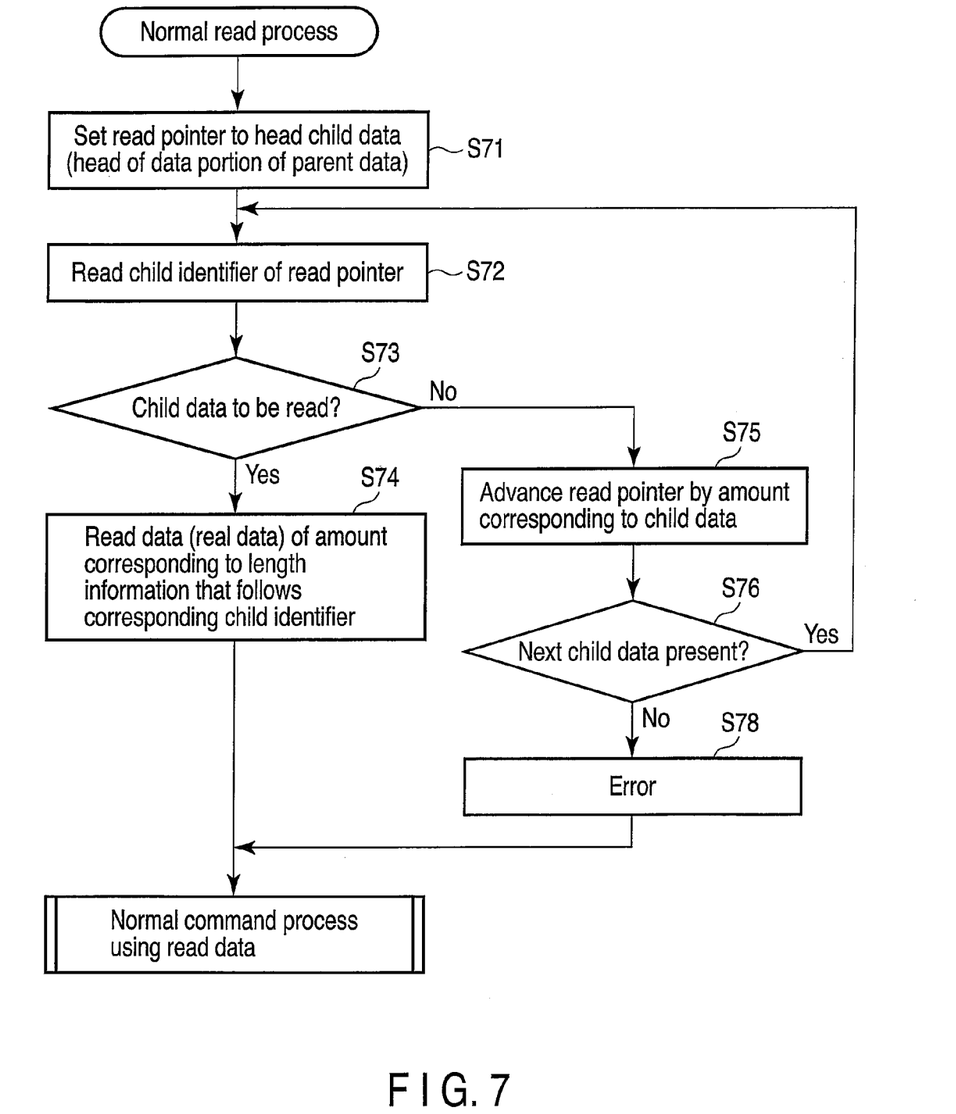
FIG. 7 is a flowchart for illustrating a flow of a normal read command process.

Next, the normal data read command process that requires a data read process is explained with reference to FIG. 7. The normal read process means a read process of data other than important data.

That is, when data other than important data is read, the control device 21 sets an address of head child data (head of real data of parent data) in the read pointer (step S71). For example, the control device 21 specifies length information and an identifier of parent data based on a head address of parent data (file) containing data to be read and sets a head address (corresponding to a head address of the first child data) in a data portion of parent data indicated by the specified length information in a read pointer.

When the read pointer is set, the control device 21 reads an identifier (child identifier) of child data indicated by the read pointer (step S72). When the child identifier is read, the control device 21 determines whether or not the read child identifier coincides with a child identifier of child data to be read specified by the command (step S73). If it is determined in the above determination step that the child identifier indicated by the read pointer coincides with the child identifier to be read (YES in step S73), the control device 21 reads data (real data of child data) indicated by length information that follows the child identifier (step S74).

If it is determined in the above determination step that the child identifier indicated by the read pointer does not coincide with the child identifier to be read (NO in step S73), the control device 21 sets a value of the read pointer to an address obtained by increasing the value by an amount corresponding to the child data (step S75). For example, the control device 21 updates the value of the read pointer to an address obtained by adding an amount corresponding to length information that follows the child identifier to the value. If the read pointer is updated, the control device 21 determines whether or not child data is present in an address indicated by the read pointer (step S76).

If it is determined in the above determination step that next child data is not present (NO in step S76), the control device 21 processes the data read operation as an error since child data specified by the command is not present (step S78).

Further, if it is determined in the above determination step that next child data is present (YES in step S76), the control device 21 performs a process of steps S72 to S76 for the next child data as data to be processed.

As described above, when receiving a command that requires data reading from the smartcard processing apparatus 1, the smartcard 2 determines whether or not data to be read specified by the command is important data by means of the important data setting table 24a. Then, if it is determined in the above determination step that the data to be read is important data, the smartcard directly reads the important data from the data memory 22 according to a head address in the data memory 22 in which the important data stored in the pointer table 22a is provided.

By the above read process, important data can be directly read from parent data stored in the data memory 22 as a file and, as a result, the smartcard 2 that can access important data at high speed and with high efficiency can be provided.

Figure 8:
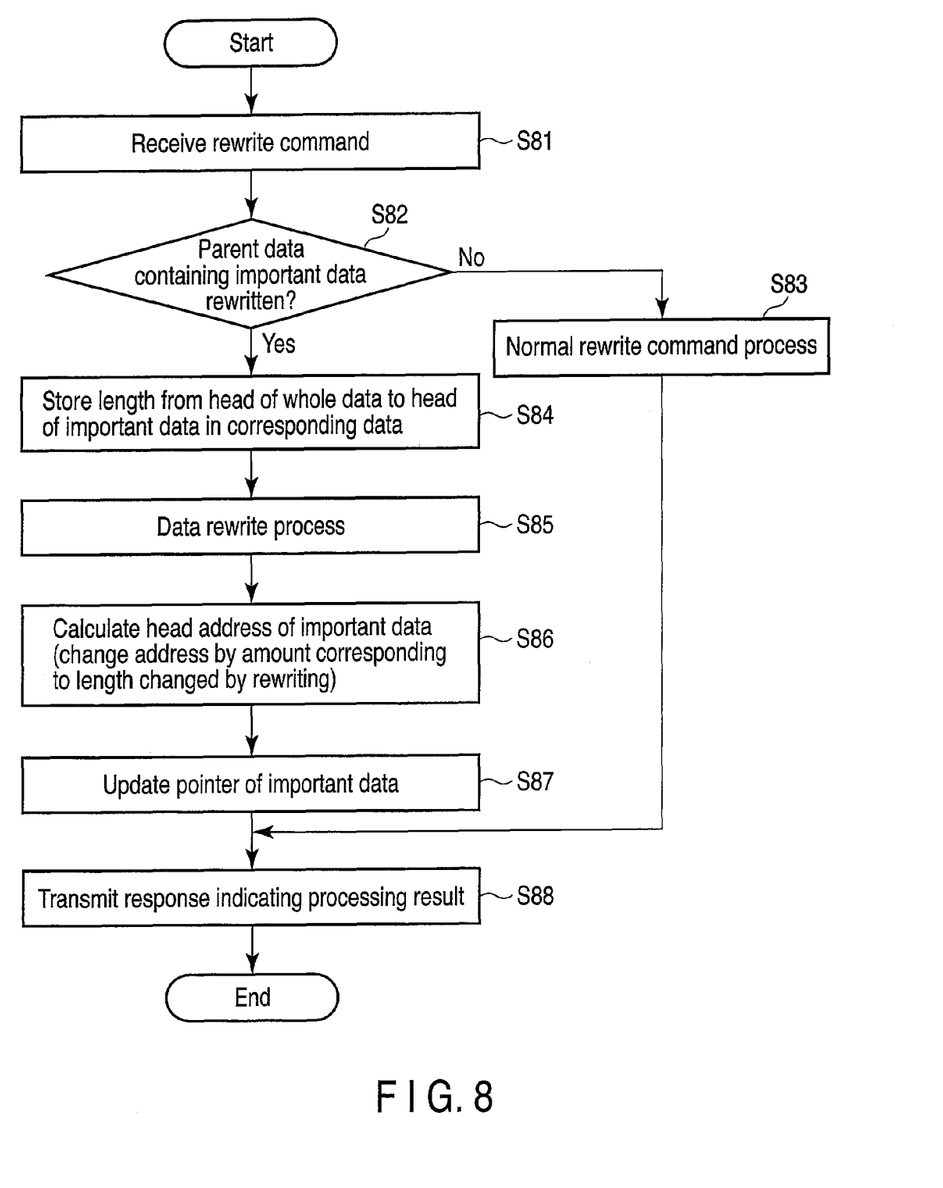
FIG. 8 is a flowchart for illustrating a flow of a process for a rewrite command in the smartcard.

Next, a process for coping with a rewrite command that requests data rewriting in the smartcard 2 is explained.

FIG. 8 is a flowchart for illustrating a flow of a process for a rewrite command (for example, an UPDATE RECORD command) in the smartcard 2. In this example, a rewrite process for data with the nested structure as shown in FIG. 4 is supposed as the process for coping with the rewrite command. Further, it is supposed that child data that is frequently used or has high importance as preset child data may be contained in the data with the nested structure used as parent data to be written.

It is supposed that the card reader/writer 12 of the smartcard processing apparatus 1 as the external device supplies a rewrite command that requests data rewriting to the smartcard 2. Then, the smartcard 2 receives data as a rewrite command via the communication portion 25 and supplies the same to the control device 21. After this, the control device 21 recognizes that the command is a rewrite command by using a command code in the data (received command) supplied from the communication portion 25 (step S81). The rewrite command contains a command code indicating a rewrite instruction, a parameter used for specifying data to be rewritten and a data portion in which data to be rewritten is stored.

When receiving the above rewrite command, the control device (CPU) 21 determines whether or not a parent identifier (identifier of a file) of parent data containing child data to be rewritten specified by the rewrite command is a parent identifier of parent data containing important data (step S82). Whether or not the data to be rewritten is the parent data containing the important data is determined based on the important data setting table 24a provided in the program memory 24.

If it is determined in the above determination step that the parent data containing the data to be rewritten is not the parent data (file) containing the important data (NO in step S82), the control device 21 performs a normal rewrite command process (step S83).

If it is determined in the above determination step that the parent data containing the data to be rewritten is the parent data (file) containing the important data (YES in step S82), the control device 21 stores the length from the head position (position of the parent identifier) of the parent data containing the data to be rewritten to the head position (position of the child identifier) of the child data as the important data in the working memory 23 (step S84).

If length information from the head of the parent data to the head of the important data is stored in the working memory 23, the control device 21 performs a process of rewriting data according to the rewrite command (step S85). At the time of rewriting data according to the rewrite command, the control device 21 calculates a head address of the important data after the data rewriting process based on the content of the data rewriting process and the length information stored in the working memory 23 (step S86).

For example, the control device 21 calculates an increase or reduction amount of the length from the head position of the parent data to the head position of the important data caused by the data rewriting process. If the data to be rewritten is data that lies behind the important data or if the data rewriting process is performed with the data length thereof kept unchanged, the length from the head position of the parent data to the head position of the important data is not changed. Further, if the data to be rewritten is data that lies in front of the important data and the data length is changed by the rewriting operation, the length from the head position of the parent data to the head position of the important data is changed. That is, the control device 21 specifies a variation in the data length caused by the rewriting operation for data that lies in front of the important data. In this case, the control device 21 can calculate a head address of important data obtained after the data rewriting operation based on a variation amount caused by data rewriting and length information stored in the working memory 23.

If the head address of the important data obtained after the data rewriting process is calculated, the control device 21 updates a pointer corresponding to the important data stored in the pointer table 22*a* according to the calculated head address of the important data (step S87).

When the above process is completed, the control device 21 transmits response data indicating the processing result of the rewrite command to the smartcard processing apparatus 1 as a transmission source of the rewrite command (step S88).

As described above, when receiving a rewrite command from the smartcard processing apparatus 1, the smartcard 2 determines whether data to be rewritten specified by the rewrite command is data in parent data containing important data based on the important data setting table 24*a*. Then, if it is determined in the above determination step that the data to be rewritten is data in the parent data containing the important data, the smartcard calculates an address in the data memory 22 in which the important data obtained after rewriting and corresponding to the rewrite command is provided and updates the pointer table 22*a* according to the calculated address of the important data.

According to the above rewriting process, at the time of data updating, the pointer table 22*a* indicating the position of the important data contained in the parent data stored as a file in the data memory 22 can also be updated. As a result, the smartcard 2 that stably accesses important data at higher speed and with higher efficiency can be provided.

According to the above embodiment, in order to access specified child data, it is not necessary to retrieve the specified child data by sequentially analyzing the data portion of parent data from the head portion and direct access can be made to the specified child data. That is, even when important data that is frequently used as preset data is stored in data with the nested structure as child data, it is not necessary to analyze the data portion of parent data for each time and access to the important data can be directly and efficiently made.

The smartcard 2 of this embodiment is used to access data stored in the data memory 22 according to a command received from the smartcard processing apparatus 1 and stores an address of the data memory 22 in which important data is stored in the pointer table in correspondence to information indicating the important data. The control device 21 of the smartcard 2 determines whether data to be accessed specified by an access request of data supplied from the smartcard processing apparatus 1 is important data or not. If it is determined in the above determination step that the data to be accessed is important data, the control device reads the important data according to a head address in the data memory 22 in which the important data stored in the pointer table 22*a* is provided. The smartcard 2 of this embodiment can efficiently access a part of important data in the file stored in the data memory 22.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A smart card comprising:
a data memory that stores data;
an important data table that stores an identifier indicating parent data that contains important data;
a write unit that writes data to be written to the data memory according to a write command supplied from an external device;
a determining unit that determines whether the data to be written contains important data according to whether an identifier of parent data stored in a head portion of the data to be written, specified by the write command, coincides with an identifier of parent data containing important data stored in the important data table;
a calculating unit that calculates a head address of the important data in the data memory based on data length from a head of the data to be written to a head of the important data and an address on the data memory at which a process of writing the data to be written is started, upon the determining unit determining that the important data is contained in the data to be written; and
a position table that stores information indicating a head address of the important data calculated by the calculating unit in correspondence to information indicating the important data.

2. The smart card according to claim 1, wherein the write command requests data with a nested structure, and the important data is child data with high frequency of use among a plurality of pieces of child data included in the data with the nested structure.

3. The smart card according to claim 1, further comprising a holding unit that holds data length from a head of data to be written specified by the write command to the head of the important data when the determining unit determines that important data is contained in the data to be written,
wherein the calculating unit calculates a head address of the important data in the data memory based on an address in the data memory at which the data writing process is started by means of the write unit and data length held in the holding unit.

4. The smart card according to claim 1, further comprising:
a second determining unit that determines whether data to be read specified by a command that is supplied from an external device and requires data reading in a course of a process is important data; and
a reading unit that reads the important data according to a position in the data memory in which the important data stored in the position table is provided if the determining unit determines that the data to be read is important data.

5. The smart card according to claim 4,
wherein the second determining unit determines whether data to be read is important data according to whether an identifier of the data to be read, specified by the command, coincides with an identifier of data used as the important data stored in the important data table.

6. The smart card according to claim 1, further comprising:
a rewrite unit that rewrites data to be rewritten according to a rewrite command supplied from an external device;
a third determining unit that determines whether the data to be rewritten specified by the rewrite command supplied from the external device is data in data containing important data;
a calculating unit that calculates a head address of the important data in the data memory after a data rewrite process corresponding to the rewrite command if the determining unit determines that the data to be rewritten is data in the data containing the important data; and
an updating unit that updates information indicating a head address of the important data stored in the position table in correspondence to information indicating the important data based on a head address of the important data calculated by the calculating unit.

7. The smart card according to claim 6, further comprising an important data table that stores information indicating an identifier that indicates parent data containing important data;
wherein the third determining unit determines whether data to be rewritten contains important data according to whether an identifier of parent data containing the data to be rewritten specified by the rewrite command coincides with an identifier of the parent data containing the important data stored in the important data table.

8. The smart card according to claim 1, wherein the important data table stores a child identifier of the important data.

9. The smart card according to claim 1, wherein the important data is determined in units of one application, and the important data table stores an identifier that indicates parent data containing important data, in units of one application.

10. A method of controlling access to smart card data, comprising:
storing the data in memory;
storing, in an important data table, an identifier indicating parent data that contains important data;
writing data to be written to the memory, according to a write command supplied from an external device;
determining whether the data to be written contains important data according to whether an identifier of parent data stored in a head portion of the data to be written, specified by the write command, coincides with an identifier of parent data containing important data stored in the important data table;
calculating a head address of the important data in the data memory based on data length from a head of the data to be written to a head of the important data and an address on the data memory at which a process of writing the data to be written is started, upon determining that the important data is contained in the data to be written; and
storing information, in a position table, that indicates a head address of the important data calculated by the calculating unit in correspondence to information indicating the important data.

* * * * *